April 19, 1949.  T. T. SHORT  2,467,863

PHASE CONVERTER

Filed Oct. 12, 1945

Inventor:
Thomas T. Short,
by Ernest C. Britton
His Attorney.

Patented Apr. 19, 1949

2,467,863

UNITED STATES PATENT OFFICE 2,467,863

PHASE CONVERTER

Thomas T. Short, Fort Wayne, Ind., assignor to General Electric Company, a corporation of New York Application October 12, 1945, Serial No. 622,030

14 Claims. (Cl. 321—58)

This invention relates to phase converters and more particularly to improvements in apparatus for transmitting power from single-phase to three-phase circuits.

Static impedance networks for splitting a single-phase supply into a three-phase output are known to the art. However, such devices are usually only suitable for supplying a particular load, that is, a load of particular size having a particular power factor, and while some attempts have been made to render such devices suitable for use with loads of different sizes and power factors by means of non-linear impedance elements, such attempts have always left something to be desired.

In accordance with a preferred embodiment of this invention there is provided a novel and simple phase converter which has two main reactive elements which are serially connected. Both of these elements include a capacitor and a saturated reactor or its equivalent. In one case the capacitor and reactor are serially connected and are so proportioned that the device has a net inductive reactance throughout its working range and in the other case the capacitor and the saturated reactor are effectively parallel connected and are so proportioned that the element has a net capacitive reactance throughout its working range. In both cases the non-linearity of the volt-ampere characteristic of the saturated reactor in combination with the capacitor produces an element having a very nearly constant voltage over a substantial range of current. In addition, there is incorporated in the device means for suppressing higher harmonics which result from saturation of the reactors.

An object of the invention is to provide a new and improved phase converter.

A further object of the invention is to provide a device for converting single-phase power to three-phase power at very nearly constant output voltage over a wide range of load magnitude and power factor.

A further object of the invention is to provide a stabilized phase converter having means for suppressing higher harmonics.

The invention will be better understood from the following description taken in connection with the accompanying drawing and its scope will be pointed out in the appended claims.

Figure 1:
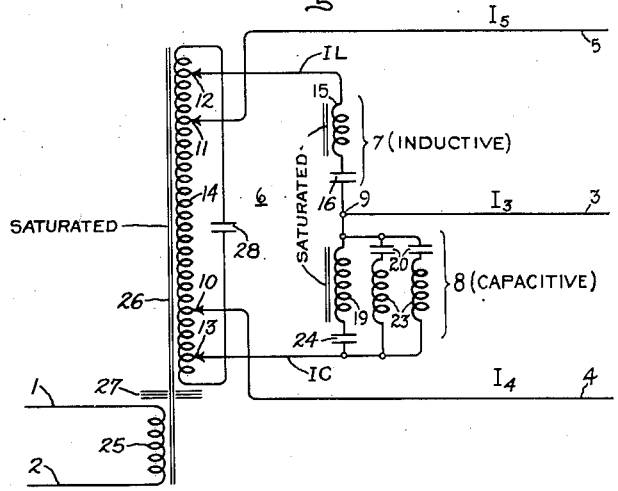
Figure 2:
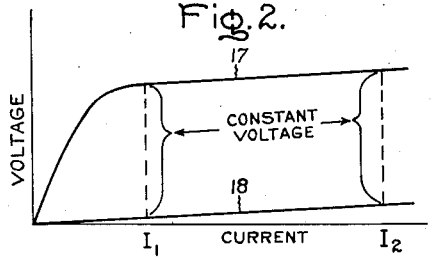
Figure 3:
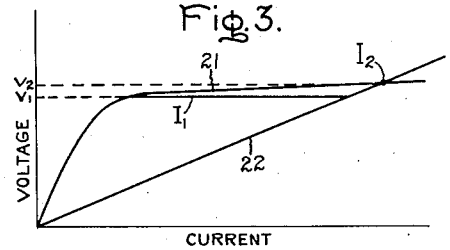
Figure 4:
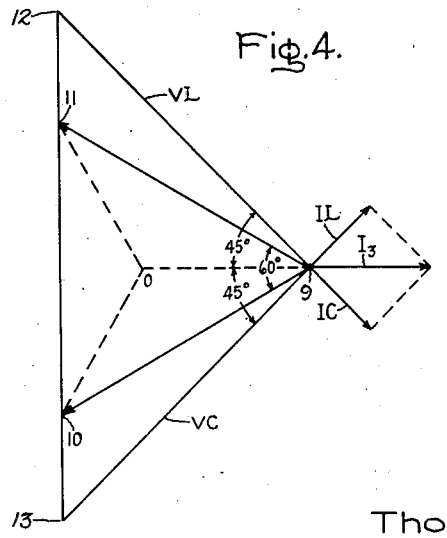

In the drawing Fig. 1 illustrates diagrammatically an embodiment of the invention, Figs. 2 and 3 are volt-ampere characteristics of different portions or elements of the circuit shown in Fig. 1, and Fig. 4 is a vector diagram for explaining the operation of Fig. 1.

Referring now to the drawing and more particularly to Fig. 1, there is shown therein a single-phase supply circuit having conductors 1 and 2 and a three-phase load circuit having conductors 3, 4 and 5. Interconnecting these circuits is a phase converter which is indicated generally by the reference character 6. The principal elements of this converter are a net inductive element 7 and a net capacitive element 8. These elements are serially connected and their junction forms one terminal 9 of the three-phase circuit. The other two terminals of the three-phase circuit are indicated at 10 and 11, while the other terminals of the elements 7 and 8 are indicated at 12 and 13. These last-mentioned four terminals are all shown as spaced points or taps on a winding 14. It will thus be seen that the voltage between the three-phase terminals 10 and 11 and the resultant voltage across the elements 7 and 8 in series are in phase with each other as they are derived from the same winding 14. The winding 14 is not essential to the invention in its broader aspects because terminals 10 and 13 can be a common terminal and also terminals 11 and 12 can be a common terminal. However, for reasons which will be explained below, the transformer effect of the winding 14 produces desirable results in certain cases.

The inductive element 7 comprises a saturated reactor 15 serially connected with a capacitor 16. These two devices have volt-ampere characteristics represented respectively by the lines 17 and 18 in Fig. 2. It will be observed that the slope of the straight line 18 which represents the volt-ampere characteristic of the capacitor is substantially equal to the slope of the curve 17, which represents the saturation characteristic of the reactor 15, beyond the bend or knee of the latter. The result is that the voltage of the element 7, being the difference between the voltages of the parts 15 and 16, will be a constant throughout a relatively wide range of current.

The capacitive element 8 likewise comprises a saturated reactor 19 and an effectively shunt or parallel connected capacitor or capacitors 20. The volt-ampere characteristic of the reactor 19 is shown by the saturation characteristic 21 in Fig. 3, which of course is generally similar to the characteristic 17 in Fig. 2, and the volt-ampere characteristic of the capacitor 20 is shown by the straight line 22 in Fig. 3. However, in Fig. 3 the characteristics 21 and 22 intersect each other. The normal working range of the element 7 is between the intersection point and the point where the slope of the curve 21 is parallel to the line 22. The current through the capacitive element 8 is the difference between the currents in the reactor 19 and the capacitor 20 and therefore varies between a value of zero at a voltage $V_2$ (neglecting losses in the element 8) and a value $I_1$ at a voltage $V_1$. There is, therefore, a relatively large variation in current for a relatively small variation in voltage and, furthermore, the current decreases when the voltage increases.

In order to suppress harmonics resulting from the saturation of the reactor 19 an additional linear or nonsaturating reactor or reactors 23 is connected in series with the capacitor 20 and the combination is tuned to the frequency of any harmonic which is to be suppressed, or in the case of two parallel branches, as shown, each branch may be tuned to resonance at a different harmonic frequency. At the fundamental frequency the reactance of the reactor 23 is low compared to the reactance of the capacitor 20 so that the combination is net capacitive and it will be understood that the volt-ampere characteristic 22 in Fig. 3 represents the combination of elements 20 and 23 at the fundamental frequency.

The operation of the illustrated embodiment of the invention is as follows: Referring to Fig. 4, the vertical vector represents the voltage of the winding 14 and the positions of the terminals 10, 11, 12 and 13 relative to this voltage vector are indicated thereon. The vectors labeled VL and VC are the voltages across the inductive element 7 and the capacitive element 8 respectively and these voltages are equal in magnitude. The points 12 and 13 are so chosen and the magnitude of the voltage of elements 7 and 8 is so chosen that the voltage vectors VL and VC are preferably in quadrature with each other. The terminals 10 and 11 are so selected on the vertical voltage vector that the voltage vectors between the three-phase terminals 9, 10 and 11 form an equilateral triangle which characterizes the delta voltages of a three-phase system.

The current vectors labeled IL and IC are shown respectively in quadrature with the voltages VL and VC and the vector $I_3$ representing the three-phase current in the line 3 from the terminal 9 is shown as the vector sum of IL and IC. This represents a unity power factor condition on the three-phase circuit as the current $I_3$ is in phase with the voltage to neutral of the terminal 9. However, the three-phase current can vary widely in both magnitude and phase without materially unbalancing the three-phase system because, as has been shown in Figs. 2 and 3, the currents IL and IC can both vary widely without materially changing the voltages VL and VC. In other words, the vector position of the terminal 9 will remain substantially fixed, while the vector $I_3$ swings in both a leading and a lagging direction about the point 9 and varies widely in magnitude.

The reason the angle between the voltage vectors VL and VC is preferably ninety degrees is because for unity power factor on the three-phase side of the converter this will result in minimum volt-amperes in the elements 7 and 8 and, therefore, these elements can be made of minimum size.

The three-phase current at the terminal 11 will have the same phase relation between the neutral and the terminal 11 as the current $I_3$ has to its leg voltage and will be the resultant of the single-phase current at the terminal 11 and the current IL when referred to the terminal 11. Similarly, the three-phase current at the terminal 10 will bear the same phase relation to the voltage between neutral and the terminal 10 that the other three-phase currents bear to their respective leg voltages and it will be the resultant of the current in the single-phase circuit referred to the terminal 10 and the current IC referred to the terminal 10. These vector currents have not been shown so as not unecessarily to complicate the diagram. It will be apparent from Fig. 4 that, if desired, terminal 13 can correspond with terminal 10 and terminal 12 can correspond with terminal 11 and the voltages VL and VC can correspond respectively with the voltages between terminals 9 and 11 on the one hand and terminals 9 and 10 on the other hand. This will permit the elimination of the winding 14, if desired, by connecting lines 1 and 2 to the combined terminals and the only difference will be that the single-phase system voltage will be equal to the line-to-line voltage of the three-phase system and the volt-amperes associated with the elements 7 and 8 will be increased for unity power factor operation of the three-phase system.

The regulation of the capacitive element 8, that is to say, the difference between the voltages $V_1$ and $V_2$ in Fig. 3, can be eliminated by connecting a capacitor 24 in series with the saturated reactor 19. The relationship between these two elements should be the same as indicated in Fig. 2 for the parts 15 and 16 of the inductive element 7. In this manner the over-all action of the circuit is improved.

The converter may also be stabilized against substantial variations in single-phase input voltage by making the winding 14 the secondary winding of an insulating transformer which is excited from a primary winding 25, the two windings being on a core 26 which is provided with a magnetic shunt 27 between them. Connected in shunt with the winding 14 is a capacitor 28 which is tuned to near resonance with the winding 14 and the portion of the core 26 which is surrounded by the winding 14 is saturated by the relatively high circulating near-resonant current. In other words, the parts 14 and 28 have voltampere characteristics which are typified by Fig. 3 so that the winding 14 will have relatively wide variations in current for relatively small variations in voltage. These variations in current when drawn through the leakage reactance of the transformer provide a regulating or stabilizing voltage drop which maintains the voltage or volts per turn of the winding 14 substantially constant for wide variations in voltage of the input circuit 1—2. In this manner the voltage between the three-phase output terminals 10 and 11 is stabilized, and as the elements 7 and 8 tend to maintain substantially constant voltage between the terminal 9 and the terminals 10 and 11 respectively, it will be seen that the three-phase output voltage will remain substantially balanced for wide variations in single-phase input voltage as well as for wide variations in three-phase load current magnitude or power factor or both.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. A phase converter comprising, in combination, a pair of single-phase terminals, three three-phase terminals, a single phase transformer, said single-phase terminals and two of said three-phase terminals being interconnected by said transformer so as to have inphase voltage difference, net inductive means having two terminals one of which is connected to the third three-phase terminal, net capacitive means having two terminals one of which is connected to the third three-phase terminal, the remaining terminals of said inductive and capacitive means being connected to said transformer so as to have a voltage difference which is in phase with the voltage difference between the single-phase terminals, the voltage difference between said remaining terminals being such that the voltages of said inductive and capacitive means are in quadrature.

2. A phase converter comprising, in combination, a pair of single-phase terminals, three three-phase terminals, a single phase transformer, said single-phase terminals and two of said three-phase terminals being interconnected by said transformer so as to have inphase voltage difference, net inductive means having two terminals one of which is connected to the third three-phase terminal, net capacitive means having two terminals one of which is connected to the third three-phase terminal, the remaining terminals of said inductive and capacitive means being connected to said transformer so as to have a voltage difference which is in phase with the voltage difference between the single-phase terminals, the voltage difference between said remaining terminals being such that the voltages of said inductive and capacitive means are in quadrature, the voltage difference between each of said remaining terminals and two different ones of said three-phase terminals being respectively equal.

3. A device for translating power between single-phase and three-phase circuits comprising, in combination, a pair of single-phase terminals, three three-phase terminals, a single phase transformer, said single-phase terminals and two of said three-phase terminals being interconnected by said transformer so as to have inphase voltage difference, net inductive means having two terminals one of which is connected to the third three-phase terminal, said net inductive means including a normally saturated reactor, net capacitive means having two terminals one of which is connected to the third three-phase terminal, the remaining terminals of said inductive and capacitive means being connected to said transformer so as to have a voltage difference which is in phase with the voltage difference between the single-phase terminals.

4. A device for translating power between single-phase and three-phase circuits comprising, in combination, a pair of single-phase terminals, three three-phase terminals, a single phase transformer, said single-phase terminals and two of said three-phase terminals being interconnected by said transformer so as to have inphase voltage difference, net inductive means having two terminals one of which is connected to the third three-phase terminal, net capacitive means having two terminals one of which is connected to the third three-phase terminal, said net capacitive means including a normally saturated reactor, the remaining terminals of said inductive and capacitive means being connected to said transformer so as to have a voltage difference which is in phase with the voltage difference between the single-phase terminals.

5. A device for translating power between single-phase and three-phase circuits comprising, in combination, a pair of single-phase terminals, three three-phase terminals, a single phase transformer, said single-phase terminals and two of said three-phase terminals being interconnected by said transformer so as to have inphase voltage difference, net inductive means having two terminals one of which is connected to the third three-phase terminal, said net inductive means including a normally saturated reactor, net capacitive means having two terminals one of which is connected to the third three-phase terminal, said net capacitive means including a normally saturated reactor, the remaining terminals of said inductive and capacitive means being connected to said transformer so as to have a voltage difference which is in phase with the voltage difference between the single-phase terminals.

6. A phase converter comprising, in combination, a pair of single-phase terminals, three three-phase terminals, a transformer directly connected to said input terminals and to two of said output terminals, net inductive means having two terminals one of which is connected to the other one of said three-phase terminals, said net inductive means including a normally saturated reactor and a capacitor serially connected therewith, net capacitive means having two terminals one of which is connected to said last-mentioned three-phase terminal, the remaining terminals of said inductive and capacitive means being connected to said transformer so as to have a voltage difference which is in phase with the voltage difference between the remaining two three-phase terminals.

7. A phase converter comprising, in combination, a pair of single-phase terminals, three three-phase terminals, a transformer directly connected to said input terminals and to two of said output terminals, net inductive means having two terminals one of which is connected to the other one of said three-phase terminals, net capacitive means having two terminals one of which is connected to said last-mentioned three-phase terminal, said net capacitive means including a normally saturated reactor and a capacitor effectively connected in shunt therewith, the remaining terminals of said inductive and capacitive means being connected to said transformer so as to have a voltage difference which is in phase with the voltage difference between the remaining two three-phase terminals.

8. A phase converter comprising, in combination, a pair of single-phase terminals, three three-phase terminals, a transformer directly connected to said input terminals and to two of said output terminals, net inductive means having two terminals one of which is connected to the other one of said three-phase terminals, said net inductive means including a normally saturated reactor and a capacitor serially connected therewith, net capacitive means having two terminals one of which is connected to said last-mentioned three-phase terminal, said net capacitive means including a normally saturated reactor and a capacitor effectively connected in shunt therewith, the remaining terminals of said inductive and capacitive means being connected to said transformer so as to have a voltage difference which is in phase with the voltage difference between the remaining two three-phase terminals.

9. A phase converter comprising, in combination, a pair of single-phase terminals, three three-phase terminals, a transformer directly connected to said input terminals and to two of said output terminals, net inductive means having two terminals one of which is connected to the other one of said three-phase terminals, net capacitive means having two terminals one of which is connected to said last-mentioned three-phase terminal, said net capacitive means including a normally saturated reactor and a capacitor effectively connected in shunt therewith, the remaining terminals of said inductive and capacitive means being connected to said transformer so as to have a voltage difference which is in phase with the voltage difference between the remaining two three-phase terminals, and a linear reactor serially connected with said capacitor, said capacitor and linear reactor being tuned to resonate at a harmonic frequency.

10. A phase converter comprising, in combination, a transformer winding, terminals for a single-phase circuit coupled to said winding, two terminals for a three-phase circuit connected to spaced points on said winding, separate non-linear net inductive and capacitive means serially connected between different spaced points on said winding, and a third terminal for said three-phase circuit connected to the junction of said non-linear means.

11. The combination recited in claim 7 plus a capacitor connected in series wtih the normally saturated reactor for improving the regulation of said net capacitive means.

12. In combination, means including a winding for stabilizing an alternating supply voltage, a polyphase circuit having a plurality of terminals two of which are connected to spaced points on said winding, phase splitting means connected to other points on said winding, and another terminal of said polyphase circuit connected to said phase splitting means.

13. The combination recited in claim 12 in which said phase splitting means comprises non-linear elements having substantially constant voltage characteristics.

14. In combination, a transformer having insulated primary and secondary windings on a common magnetic core, a capacitor connected across said secondary winding and tuned to the neighborhood of resonance therewith so as to saturate the portion of the core which is surrounded by said secondary winding, a magnetic shunt on said core between said windings, non-linear constant voltage characteristic phase splitting means connected to said winding, and a polyphase circuit having a plurality of terminals two of which are connected to said secondary winding and another of which is connected to said phase splitting means.

THOMAS T. SHORT.

REFERENCES CITED

The following references are of record in the file of this patent:

UNITED STATES PATENTS

| Number | Name | Date |
|---|---|---|
| 1,848,866 | Baker | Mar. 8, 1932 |
| 1,951,026 | Levine | Mar. 13, 1934 |
| 2,253,053 | Stevens et al. | Aug. 19, 1941 |
| 2,380,456 | Stevens et al. | Apr. 21, 1942 |